United States Patent [19]

Kitamoto et al.

[11] 3,767,580

[45] Oct. 23, 1973

[54] PROCESS FOR TREATING FERROMAGNETIC CHROMIUM DIOXIDE

[75] Inventors: Tatsuji Kitamoto; Goro Akashi, both of Kanagawa, Japan

[73] Assignee: Fuji Photo Film Co., Ltd., Kanagawa, Japan

[22] Filed: Oct. 20, 1971

[21] Appl. No.: 191,094

[30] Foreign Application Priority Data

Oct. 20, 1970 Japan ............................ 45/91823

[52] U.S. Cl. ............................ 252/62.51, 423/607

[51] Int. Cl. ............................ C01g 37/02

[58] Field of Search .................... 252/62.51; 23/145; 117/235; 423/607

[56] References Cited

UNITED STATES PATENTS

| | | | |
|---|---|---|---|
| 3,449,073 | 6/1969 | Balthis | 23/145 |
| 3,451,771 | 6/1969 | Cox et al. | 23/145 |
| 3,529,930 | 9/1970 | Bottjer et al. | 23/145 |

*Primary Examiner*—Oscar R. Vertiz
*Assistant Examiner*—J. Cooper
*Attorney*—Sughrue, Rothwell, Mion, Zinn and MacPeak

[57] ABSTRACT

In the production of ferromagnetic chromium dioxide or modified chromium dioxide containing guest-components, such as Te or Sb, chromium ions from water-soluble chromium compounds remaining in the final product cause various disadvantages. These disadvantages have now been overcome by treating the final product consisting mainly of ferromagnetic chromium dioxide or modified chromium dioxide with a compound, such as barium chloride or sodium hydroxide, which reacts with the chromium ions to form water-insoluble chromium compounds.

9 Claims, No Drawings

PROCESS FOR TREATING FERROMAGNETIC CHROMIUM DIOXIDE

BACKGROUND OF THE INVENTION

1. Field of the Invention

This invention relates to an improvement of a process for producing ferromagnetic chromium dioxide or modified chromium dioxide for use in magnetic recording, thermomagnetic recording, permanent magnets, etc. More specifically, the invention relates to a process for treating the final product obtained by the reaction forming ferromagnetic chromium dioxide or modified chromium dioxide, said product, substantially all of which is ferromagnetic chromium dioxide or modified chromium dioxide, containing small amounts of unreacted water-soluble chromium compounds, the chromium ions of which cause many disadvantages, thereby purifying the product to remove the chromium ions.

2. Prior Art

Chromium dioxide is a ferromagnetic substance having a rutile crystal structure obtained by the thermal decomposition of a hexavalent chromium compound, or by the oxidation of a divalent or trivalent chromium compound. However, since chromium dioxide cannot be present as a stable phase under normal atmospheric pressure, the production of chromium dioxide is performed generally by heating the starting material under high temperature and high pressure conditions. For example, the Russian publication by S.M. Ariya et al. (Zhur. Obshei.Khim. Soviet 23, page 1241, 1953) has disclosed that ferromagnetic chromium dioxide in a single phase of rutile structure can be obtained by the thermal decomposition of anhydrous chromium trioxide at a temperature of 420°C. to 450°C., under an oxygen pressure of 200 to 300 atmospheres. U.S. Pat. No. 2,956,955 to P. Arthur, has also disclosed a process for preparing ferromagnetic chromium dioxide in which chromium trioxide is heated in water at a temperature of 400°C. to 525°C., under a pressure of at least 500 atmospheres. U.S. Pat. No. 3,117,093 has disclosed a process for preparing ferromagnetic chromium dioxide in which an insoluble oxide of chromium, wherein the average valence of the chromium is above 4 and below 6, is heated under hydrothermal conditions to a temperature of 250° – 500°C., under a pressure ranging from 50–3,000 atmospheres or more. B. Kubota et al. discloses in U.S. Pat. No. 3,243,260 a process for producing a rutile type ferromagnetic chromium dioxide which comprises heating a mixture of chromium trioxide at a temperature between 380°C. and 480°C., in the presence of oxygen. N.L. Cox disclosed in U.S. Pat. No. 3,278,263 a process for the preparation of ferromagnetic chromium dioxide which comprises heating, at a temperature in the range of 250°–500°C., at a pressure of about 50–3,000 atmospheres and in the presence of water, a compound of chromium (III) combined with oxygen with an oxidizing agent. Furthermore, F. Hund disclosed in U.S. Pat. No. 3,371,043 a process for forming ferromagnetic chromium dioxide by a two-step doping process wherein a mixture containing $CrO_3$ is heated in an aqueous medium under hydrothermal conditions at a temperature of between 100° and 500°C., and a pressure of between 1 and 500 atmospheres in both steps. For improving the magnetic properties, especially the coercive force, of chromium dioxide at this time, modification by ruthenium, as a guest component, as disclosed in U.S. Pat. No. 2,885,365, antimony as disclosed in U.S. Pat. No. 2,923,683, tin as disclosed in U.S. Pat. No. 2,923,684, alkali metals such as sodium and potassium as disclosed in U.S. Pat. No. 2,923,685, vanadium, manganese, iron, cobalt or nickel as disclosed in U.S. Pat. No. 3,034,988, fluorine as disclosed in U.S. Pat. No. 3,068,176 and tellurium as disclosed in U.S. Pat. No. 3,243,260, etc., are effective. It is known that by such a modifying method, there can be obtained modified chromium dioxide having desirable properties for magnetic recording as represented by a coercive force of 250 to 600 oersted.

Such chromium dioxide (or modified chromium dioxide) is usually obtained as a solid mass consisting of an aggregate of acicular fine particles with a length of less than 10 $\mu$, and contains strongly oxidizing substances such as unreacted chromic acid ions. If the chromium dioxide as such is dispersed in a binder composed of an organic polymer such as a vinyl acetate/vinyl chloride copolymer, cellulose derivatives, phenolic resins, epoxy resins, polyurethane resins, etc., and the dispersion is coated on the surface of a support to form a magnetic recording layer, the binder undergoes deterioration by the strong oxidizing action of chromic acid. Furthermore, when such a magnetic recording material is placed in a highly humid environment during use, the water-soluble chromic compound oozes out onto the surface of the magnetic recording layer, and the recording head of the recorder which comes into contact with the magnetic recording layer is corroded.

Previous attempts to avoid this involved a thorough washing of chromium dioxide in a powdery state with water so that the unreacted chromium compound is removed until there is no appreciable amount left in the wash liquid.

However, chromium dioxide particles having a coercive force of 300 to 600 oersted used for magnetic recording are fine particles having a length of less than one micron. The complete removal of the unreacted component by washing such fine powders with water, encounters considerable difficulties in industrial operation because the filtration speed is slow in the case of employing the filtration method, and when the water decantation washing method is used, the speed of sedimentation of the particles is slow. Moreover, chromium ions are regarded as toxic to humans, and discarding them in waste water is undesirable from the standpoint of public health.

3. Objects of the Invention

Accordingly, an object of the present invention is to provide a process for treating chromium dioxide powders, which has eliminated the defects of the prior art, and in which a part or all of the unreacted chromium ions are chemically reacted and treated as insoluble precipitates.

Other objects will be apparent to those skilled in the art as the description of this invention proceeds.

BRIEF SUMMARY OF THE INVENTION

According to the present invention, there is provided a process for producing ferromagnetic chromium dioxide or modified chromium dioxide by the thermal decomposition of hexavalent chromium compounds or by the oxidation of divalent or trivalent chromium compounds at high temperatures and under high pressures with or without the addition of guest-elements or -compounds in which the thermal decomposition-product or oxidation product consisting mainly of ferromagnetic chromium dioxide or modified chromium dioxide is treated with a compound which reacts with chromium ions from water-soluble chromium compounds remaining in the product to form water-insoluble chromium compounds.

DETAILED DESCRIPTION OF THE INVENTION

The "ferromagnetic chromium dioxide or ferromagnetic modified chromium dioxide" refers to chromium dioxide having a rutile structure produced at high temperatures and under high pressures, or modified chromium dioxide derivatives which are obtained by adding antimony, tellurium, tin, iron, cobalt, or other elements or compounds thereof as disclosed in the prior art, to said chromium dioxide for improving various properties such as the size of the particles, the coercive force, or Curie points. Usually, the amounts of elements other than chromium and oxygen contained in the chromium dioxide derivatives do not exceed 10 atomic percent of the whole.

The ferromagnetic chromium dioxide and ferromagnetic modified chromium dioxide (to be referred to as "chromium dioxide" hereinbelow) are produced by the thermal decomposition of hexavalent chromium, or the oxidation of divalent or trivalent chromium. In the former process, unreacted hexavalent chromium, and in the latter, unreacted trivalent chromium and hexavalent chromium generated as a result of excessive oxidation, is present in an amount of 0.1 to 10 percent by weight or so even under normal reaction conditions, and the above-described inconveniences are caused.

Examples of the water-soluble chromium compounds are anhydrous chromic acid, salts of chromic acids, salts of bichromic acid, or trivalent chromium salts such as chromium chloride (III) or chromium nitrate (III).

Examples of the compounds which upon reaction with these chromium compounds, convert them to water-insoluble chromium compounds and effectively prevent the chemical action of the chromium compounds of organic matter and the corrosion of the recording head as a result of the migration of the chromium compounds onto the surface of the magnetic recording layer include silver compounds such as silver nitrate, zinc compounds such as zinc chloride, zinc nitrate, or zinc acetate, barium compounds such as barium chloride or barium nitrate, and lead compounds such as lead chloride, lead nitrate, or lead acetate. These compounds react with hexavalent chromium to form chromic acid salts or bichromic acid salts which are water-insoluble. Trivalent chromium can be effectively neutralized with alkalies such as sodium hydroxide or potassium hydroxide. The water-insoluble compounds, as referred to herein, mean compounds which are substantially insoluble in water and have a water solubility of less than 0.01 percent at room temperature (0.01 g dissolved in 100 g).

The termination of the treatment in accordance with the process of the present invention can be determined by the absence of chromium ions in the wash liquid or supernatant liquid.

As previously stated, the material to be treated with the process of the present invention is the product consisting mainly of chromium dioxide and its derivatives. According to the treatment of the present invention, a non-magnetic water-insoluble compound remains in the product, and weakens the magnetism of the product. In order to avoid this, the "chromium dioxide," the main product, should be present, for example, in an amount of at least 80 percent of the entire product.

The invention will be illustrated in detail by the following Examples:

EXAMPLE 1.

A 2-liter high pressure reactor was charged with 95 parts by weight of chromic anhydride, 5 parts by weight of tellurium dioxide, and 20 parts by weight of water, and oxygen gas was introduced to a pressure of 50 atmospheres. These compounds were heated at 450°C., and maintained at this temperature for 10 hours. The pressure in the reactor reached 500 atmospheres at the highest. After cooling, the resulting black mass was taken out, and pulverized. A part of the pulverized product was taken out, and soluble chromium ions present in it were dissolved out with water. A 3 percent solution of barium chloride was added to form a precipitate of barium chromate. The precipitate was removed by filtration, washed with water, dried and weighed. The quantitative analysis of soluble chromium ions was performed. It was found that the product contained 1.5 percent by weight of soluble chromium ions calculated as chromic anhydride.

The remaining sample product was divided into two. One sample was decanted and washed with 10 times by weight of pure water to reduce the soluble chromium salt content to about 0.2 percent by weight. Then, 1.2 equivalents of a 3 percent aqueous solution of barium chloride was added to the sample, and after thorough mixing, the mixing was dehydrated and dried.

The other sample was admixed with 2 times by weight of water, and the mixture was well stirred. A 5 percent aqueous solution of lead nitrate was added until its amount became equivalent. The mixture was then dehydrated and dried.

In the first sample, the remaining soluble chromium ions were converted to barium chromate, and in the second, the soluble chromium ions were converted to lead chromate. It was confirmed that no soluble chromium ions remained.

EXAMPLE 2

A high pressure reactor of the same type as used in Example 1 was charged with 50 parts of a product which had been obtained by neutralizing a 5 percent aqueous solution of chromium chloride (III) with aqueous ammonia, thoroughly washing the neutralized product with water, and dehydrating and drying the same, 45 parts by weight of chromic anhydride, 5 parts by weight of antimony oxide, and 50 parts by weight of water, after mixing these compounds uniformly. Oxygen gas was introduced into the reactor to a pressure of 50 atmospheres, and the mixture was heated at 450°C., for 10 hours. The highest pressure attained at this time was 470 atmospheres. After cooling, the resulting black mass was pulverized and analyzed. It was found that the mass contained 2.5 percent of hexavalent chromium calculated as chromic anhydride, but no trivalent chromium.

Twice its volume of pure water was added to the mass, and then a 3% aqueous solution of zinc nitrate was also added in an equivalent amount. The mixture was dehydrated and dried. The resulting powders did not contain soluble chromium ions.

As described above, according to the process of the present invention, water-soluble chromium ions remaining in "chromium dioxide" powders are converted rapidly and simply to substantially water-insoluble compounds, so that when the chromium dioxide is used for magnetic recording, thermomagnetic recording, or forming permanent magnets, the deterioration of an organic binder in the magnetic recording layer can be prevented, and there is no fear of corrosion of recorder parts owing to the migration of the corrosive chromium compounds onto the surface of the magnetic recording layer.

We have not furnished any working example in which trivalent chromium is treated. The essence of the present invention lies in the method wherein remaining water-soluble chromium ions are chemically converted to water-insoluble compounds and thus stabilized in the chromium dioxide powders. If considerable amounts of trivalent chromium ions remain in the product and need to be treated by the process of the invention, the product is treated with an alkali material to convert trivalent chromium ions to a water-soluble compound such as alkali hydroxides.

What is claimed is:

1. A process for producing ferromagnetic chromium dioxide comprising thermally decomposing a hexavalent chromium compound or oxidizing a divalent or trivalent chromium compound at high temperatures and under high pressures to produce ferromagnetic chromium dioxide containing unreacted water-soluble chromium ions, and thereafter treating said ferromagnetic chromium dioxide containing said unreacted water-soluble chromium ions with a compound which reacts with the water-soluble chromium ions contained therein to form water-insoluble chromium compounds having a water solubility of less than 0.01 g in 100 g of water at room temperature, to thereby produce a composition containing at least 80 percent by weight, based on the weight of the composition, of ferromagnetic chromium dioxide.

2. A process according to claim 1 wherein said thermal de-composition or oxidation is conducted in the presence of guest components which become part of the ferromagnetic chromium dioxide and which improve the ferromagnetic properties thereof.

3. A process according to claim 2 wherein aid guest components are selected from the group consisting of ruthenium, antimony, tin, sodium, potassium, vanadium, manganese, iron, cobalt, nickel, fluorine and tellurium and wherein said guest components are present in said product ferromagnetic chromium dioxide in an amount of not greater than 10 atomic percent, based on said chromium dioxide.

4. A process according to claim 3 wherein said unreacted water-soluble chromium ions are derived from anhydrous chromic acid, salts thereof, salts of bichromic acid, trivalent chromium chloride or trivalent chromium nitrate.

5. A process according to claim 1, wherein said compound used in said treatment is silver nitrate.

6. A process according to claim 1, wherein said compound used in said treatment is a zinc compound selected from the group consisting of zinc chloride, zinc nitrate and zinc acetate.

7. A process according to claim 1, wherein said compound used in said treatment is a barium compound selected from the group consisting of barium chloride and barium nitrate.

8. A process according to claim 1, wherein said compound used in said treatment is a lead compound selected from the group consisting of lead chloride, lead nitrate and lead acetate.

9. A process according to claim 1, wherein said compound used in said treatment is an alkali compound selected from the group consisting of sodium hydroxide and potassium hydroxide.

* * * * *